Feb. 19, 1924. 1,484,056
F. W. BIRTCH
HOT WATER TANK COVER OR JACKET
Filed April 27, 1923 2 Sheets-Sheet 1
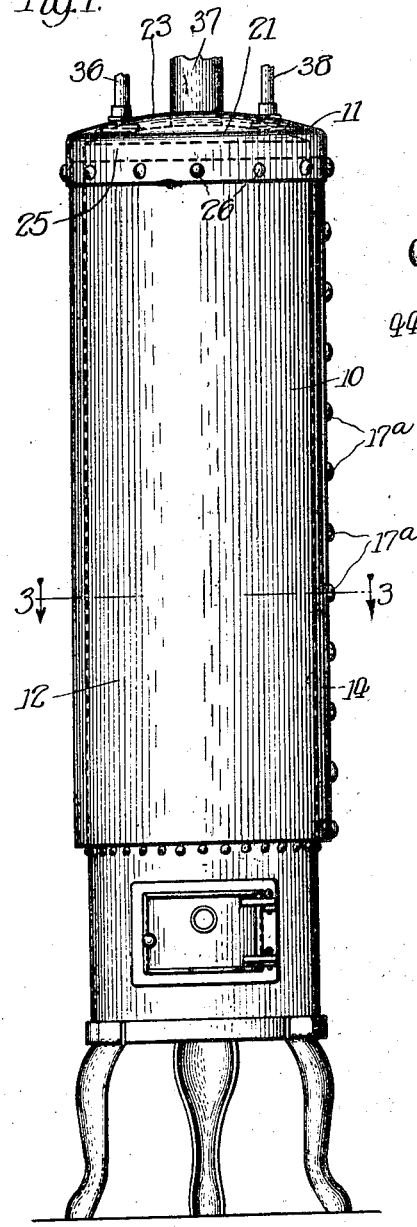
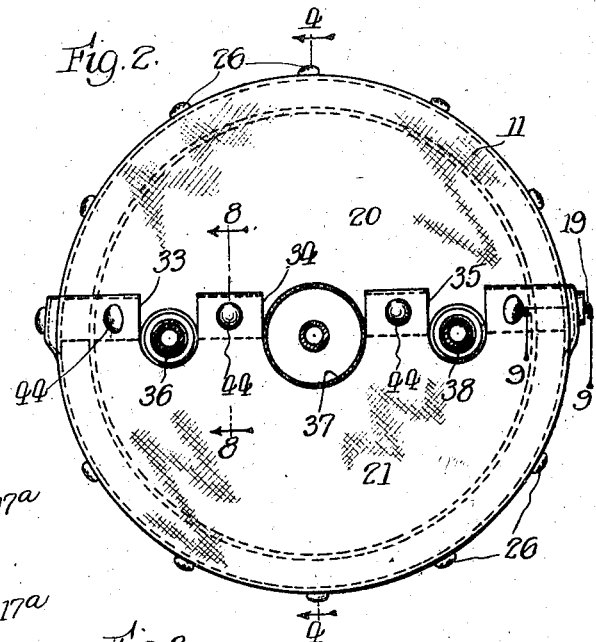
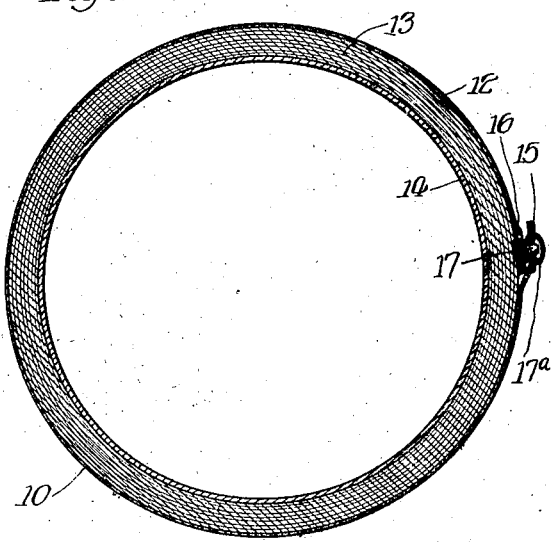
Inventor:
Fred W. Birtch,
By Harvey L. Hanson
Attorney.
Witness:
A. J. Sauser.

Feb. 19, 1924. 1,484,056
F. W. BIRTCH
HOT WATER TANK COVER OR JACKET
Filed April 27, 1923 2 Sheets-Sheet 2
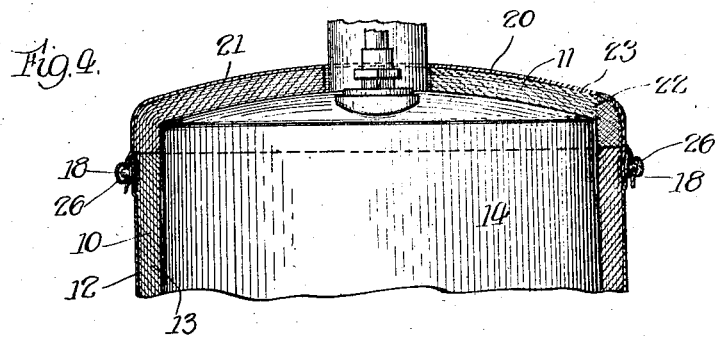
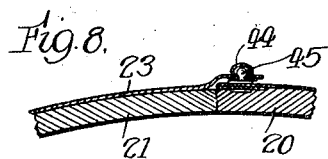
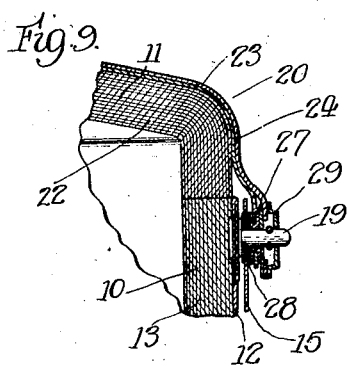
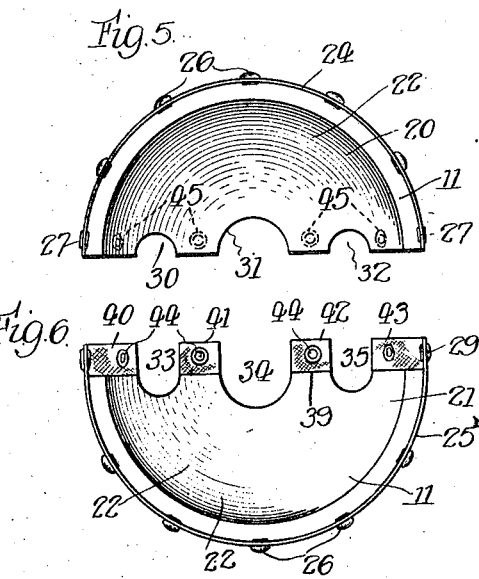
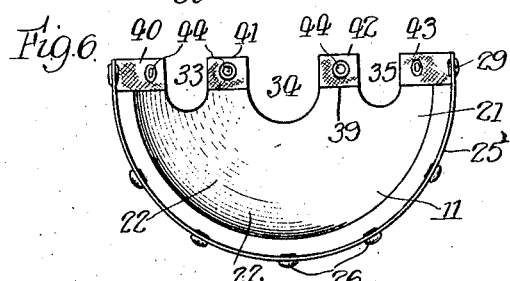
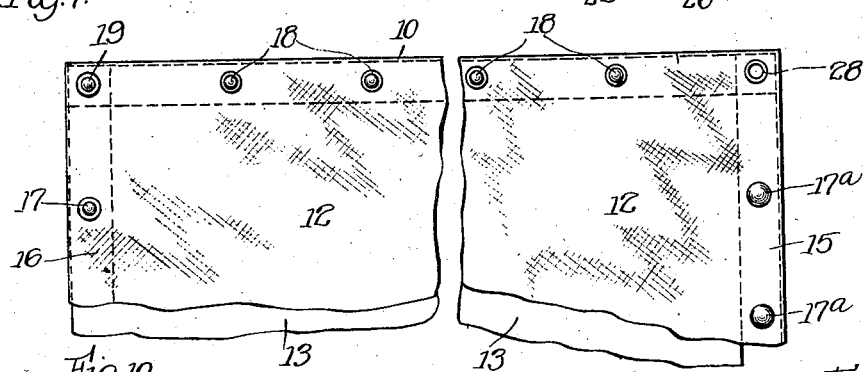
Inventor:
Fred W. Birtch,
By Harvey L. Hanson
Attorney
Witness
A. J. Sauser Patented Feb. 19, 1924.

1,484,056

UNITED STATES PATENT OFFICE.

FRED W. BIRTCH, OF LAPORTE, INDIANA, ASSIGNOR TO BASTIAN-MORLEY CO., OF LAPORTE, INDIANA, A CORPORATION OF INDIANA.

HOT-WATER-TANK COVER OR JACKET.

Application filed April 27, 1923. Serial No. 635,177.

*To all whom it may concern:*

Be it known that I, FRED W. BIRTCH, a citizen of the United States, residing at Laporte, in the county of Laporte and State of Indiana, have invented a certain new and useful Improvement in Hot-Water-Tank Covers or Jackets, of which the following is a full, clear, concise, and exact description, reference being had to the accompanying drawings, forming a part of this specification.

The invention relates to hot water tank covers or jackets which have as their prime object the provision of means for insulating the tank against the escape and dissipation of the heat contained in the water confined in the tank.

The invention has as its object the production of a construction embodying asbestos, or other suitable material, capable of retaining heat in the tank, which may be associated with the tank, either prior to or after the tank has been installed or set up for service, the construction permitting of its being readily removed from the tank without causing any injury to the cover upon its removal.

It is an additional object to provide a cover or jacket which is capable of being applied to a tank without the aid of any tools, the parts forming the cover or jacket having means which cooperate with each other to permit them to be removably held in their proper relative and associated relation.

It is a further object to provide a construction which will enclose the tank throughout its length and circumference, and, in addition, cap or cover the upper end of the tank.

It is another object of the invention to so construct the cap which covers the upper end of the tank that it will permit the association of the cap with the tank and readily accommodate the various pipes and connections which extend from this end of the tank.

In addition to the above named objects, it is a further object to provide a cover for the tank, that portion thereof which surrounds the tank throughout its length being flexible, and to associate with this flexible cover or sheath a member which will provide a cap, which comprises separable sections, which may be positioned so that they may be applied to the upper end of the tank and then be arranged to encase the upper end of the tank.

It is another feature of the invention to form a cap so that it will conform with the outline of the tank and snugly fit the upper end thereof.

It is another object of the invention to provide a cover or jacket, such as above referred to, the outer surface of which is composed of a suitable fabric, or other material, which will readily permit of its being painted, coated, or otherwise decorated, to suit the desires of the person in whose home or room the tank is situated.

The invention will be explained in conjunction with the accompanying drawings, which illustrate one embodiment of which the invention is susceptible, it being obvious that changes and modifications may be made without departing from the spirit of the appended claims.

In the drawings:

Figure 1 is a front elevation of a hot water tank and support, showing the removable heat retaining cover or jacket applied to the tank.

Figure 2 is a top plan view of the structure illustrated in Figure 1.

Figure 3 is a section taken on line 3—3 of Figure 1.

Figure 4 is a section taken on line 4—4 of Figure 2.

Figure 5 is a bottom plan view of a part of the cap of the jacket.

Figure 6 is a bottom plan view of the remainder of the cap of the jacket.

Figure 7 is an elevation of a fragment of the main body of the cover, or sheath, which surrounds the water tank throughout its length.

Figure 8 is a section taken on line 8—8 of Figure 2.

Figure 9 is a section taken on line 9—9 of Figure 2.

Figure 10 is a sectional view of a fragment of the main body of the cover.

The cover or jacket illustrated in the drawings includes the main body portion or coat, generally designated 10, which forms a sheath or tube and surrounds the tank throughout its entire length, and the cap generally designated 11, which is arranged upon the upper end of the tank and separably or removably secured to the sheath or tube 10 adjacent its upper edge.

The sheath 10 is composed of an outer coat or casing 12, which may be of any suitable material, such as canvas, and the heat insulating material 13, which is secured to the casing or fabric 12, preferably by some suitable adhesive. In the present instance the insulating material is composed of a number of sheets of asbestos. The sheath or tube formed or produced by the coat or casing 12 and the heat insulating material 13 are sufficiently flexible to permit of their being wrapped around the tank 14 and have their adjacent edges provided with means which cooperate with each other to permit the ends to be releasably locked.

By referring to Figure 3, it will be noted that one edge or flap 15 of the fabric 12 overlaps the other edge or flap 16 thereof, and each of these edges or flaps are, respectively, provided with one part of a fastener, i. e., the stud 17, and the other with another part of a fastener, i. e., the socket 17ª. As clearly shown in Figure 1, a number of these fasteners are employed. They are arranged in separated relation along the opposite edges of the sheath or tube 10. It is, therefore, manifest that, should it be desired to remove the sheath 10, all that would be necessary would be to pull upon the flap or extension 15 which would cause the fasteners composed of the studs and sockets 17 and 17ª, respectively, to be separated.

The upper extremity or edge of the sheath or tube 10 is provided with a plurality of studs 18, which are disposed in spaced relation to each other throughout the entire circumference of this portion of the cover which surrounds the tank. The studs 18 are employed to provide an element of a means whereby the cap 11 may be detachably secured to the sheath or tube 10.

One of the studs, such as 19, clearly illustrated in Figure 9, is of a relatively longer dimension than the remaining studs and is employed to accommodate and assist in holding the several thicknesses of material which come together at this point.

The cap 11, which forms the cover for the upper end of the tank 14, is preferably formed of two separate sections, designated 20 and 21, respectively, and are clearly shown in Figures 2, 5, and 6. The cap is shaped or pressed to conform with the contour of the upper end of the tank, and, in the present instance, is composed of the asbestos lining or filler 22 and the outer coat or fabric 23. In the structure employed the asbestos lining of the cap is molded into the desired shape, while in a plastic form, and permitted to harden, and will thus retain its shape when set. The fabric forming the outer coat of each part of the cap 20 and 21 extends beyond the edge of the asbestos lining 23 and provides skirt portions. These skirt portions are, respectively, designated 24 and 25, and each of these portions are provided with a plurality of locking elements or sockets 26, which are similar to the sockets of the ordinary glove fastener. The sockets 26 cooperate with the studs 18 placed adjacent the upper edge of the sheath or tube 10, and provide a convenient means whereby the portions forming the cap may be removably associated with the sheath or tube 10.

By referring to Figures 5 and 6, it will be noted that the extension or skirt 24 of the portion 20 of the cap is provided with apertures 27, 27, which may be reinforced with metallic eyelets, as clearly shown in Figure 9.

It is evident that, when the portions forming the cap are properly arranged relatively to the upper end of the sheath 10, that the sockets 26 of the fastener may be caused to cooperate with the studs 18 throughout the circumference of the cover and thereby provide a means for holding these portions of the cap with relation to the sheath. As before stated, the sheath or tube 10 is provided with the stud 19, which is of a relatively longer dimension than the remaining studs, which are disposed throughout the circumference of the tank. This relatively longer stud is secured to one corner of the upper edge of the sheath 10. The opposite corner of the sheath 10 is provided with a reinforced opening 28, which is adapted to be passed over the stud 19 when the cover is wrapped around the tank. One of the openings 27 in one of the portions of the cap is also adapted to be passed over the stud 19 and all of said portions of both the cap 11 and the sheath 10 are designed to be held in their associated relation through the medium of the holding element 29, provided upon the cap, which cooperates with the stud 19 to releasably lock the various elements in the position illustrated in Figure 9. Again, referring to the structure illustrated in Figures 2, 5, and 6, it will be noted that each portion 20 and 21, which form the cap, is provided with a plurality of segmental openings, respectively designated 30, 31, 32, and 33, 34, 35, which, when the two portions forming the cap are brought together, complete apertures which permit pipes, such as 36, 37, and 38, which extend from the tank, to project through the cap. The fabric which forms the outermost portion of the cap of one section, 21, is extended beyond the edge 39 thereof, and provides the extensions 40, 41, 42, and 43, each of which is provided with a socket of a fastener designated 44, which is designed to cooperate with a stud 45 provided upon the other portion 20 of the cap. The structure just described provides a convenient and simple arrangement for securing and maintaining the two portions of the cap together, yet will permit of their separation without any injury occurring to them when this is found necessary.

From the foregoing description it is manifest that an insulating structure is provided which may be conveniently applied to a tank and which will successfully prevent the escape and dissipation of the heat contained in the water confined in the tank and which may be readily associated with or removed from the tank, either prior or subsequent to the installation of the tank. It is also evident that means is provided for insulating the upper end of the tank, which means is capable of association with this portion of the tank despite the fact that in many instances pipe connections which extend from the tank would ordinarily interfere with the association of an element for insulating this portion of the tank.

Having thus described the invention, what I claim and desire to secure by Letters Patent is:

1. A cover or jacket of the character described, comprising flexible heat insulating material and means for securing the ends of said material together, said means including means arranged adjacent the edges of said material whereby said edges are separably secured together, and a member providing a cap for the end of said first mentioned material and means for securing said cap and material together.

2. A cover or jacket of the character described comprising flexible heat insulating material which is permitted to be secured together at its edges to produce a sheath or tube, and a member also comprising heat insulating material providing a cap for the end of said tubular member, said cap and tubular member having means for securing said cap and member together.

3. A cover or jacket of the character described comprising flexible heat insulating material which is permitted to be secured together at its edges to produce a sheath or tube, and a member also comprising heat insulating material providing a cap for the end of said tubular member, said cap being separable and said cap and tubular member having means for securing said cap and member together.

4. A cover or jacket of the character described comprising flexible heat insulating material which is permitted to be secured together at its edges to produce a sheath or tube, and a member also comprising heat insulating material providing a cap for the end of said tubular member, said cap comprising separable elements having means for securing said elements together and said cap and tubular member having means for securing said cap and member together.

5. A cover or jacket of the character described comprising flexible heat insulating material which is permitted to be secured together at its edges to produce a sheath or tube, and a member also comprising heat insulating material providing a cap for the end of said tubular member, said cap and tubular member having means for securing said cap and member together, said cap being provided with an aperture to permit a portion of the cap to surround a member which extends from the device to be covered.

6. A cover or jacket of the character described comprising flexible heat insulating material, the opposed edges thereof being provided with means for securing said edges together to form a sheath or tube, and a cap adapted to be associated with the end of said tube, said cap having an extension, and means provided upon said extension whereby said cap and tube may be detachably connected together.

7. A cover or jacket of the character described comprising flexible heat insulating material, the opposed edges thereof being provided with means for securing said edges together to form a sheath or tube, and a cap comprising separable elements adapted to be associated with the end of said tube, said cap having an extension, and means provided upon said extension whereby said cap and tube may be detachably connected together.

8. A cover or jacket of the character described comprising flexible heat insulating material, the opposed edges thereof being provided with means for securing said edges together to form a sheath or tube, and a cap comprising separable elements having means for connecting said elements together adapted to be associated with the end of said tube, said cap having an extension, and means provided upon said extension whereby said cap and tube may be detachably connected together.

9. A cover or jacket of the character described comprising flexible heat insulating material, the opposed edges thereof being provided with means for securing said edges together to form a sheath or tube, and a cap comprising elements which are separably connected together adapted to be associated with the end of said tube, said cap having an extension, and means provided upon said extension whereby said cap and tube may be detachably connected together.

10. A cover or jacket of the character described comprising flexible heat insulating material which is permitted to be secured together at its edges to produce a tube, and a member also comprising heat insulating material providing a cap for the end of said tubular member, said cap comprising elements which are connected together to permit of their being brought together and separated, said cap and tubular member having means for securing said cap and member together.

11. A cover or jacket of the character described comprising heat insulating material, said cover including a portion which may be formed to produce a sheath or tube and having a portion providing a closure for said tube when formed and means for securing said portions against separation.

12. A cover or jacket of the character described comprising heat insulating material, said cover including a portion which may be formed to produce a sheath or tube and having a portion providing a closure for said tube when formed and means provided upon said cap and the portion forming said tube for securing said portions against separation.

13. A cover or jacket of the character described comprising heat insulating material, said cover including separable elements, each of which include portions which are adapted to cooperate with each other to form a sheath or tube and a cap for said tube, said portions whereby said cap and tube are formed each being provided with means for holding said portions in cooperative relation to produce said cap and tube.

14. A cover or jacket of the character described comprising heat insulating material, said cover including connected, separable elements, each of which include portions which are adapted to cooperate with each other to form a sheath or tube and a cap for said tube, said portions whereby said cap and tube are formed each being provided with means for holding said portions in cooperative relation to produce said cap and tube.

In witness whereof, I hereunto subscribe my name this 16th day of April, A. D., 1923.

FRED W. BIRTCH.